April 24, 1962      L. I. KAPLAN      3,031,238
ANTI-FRICTION BEARING ASSEMBLY
Filed March 28, 1960
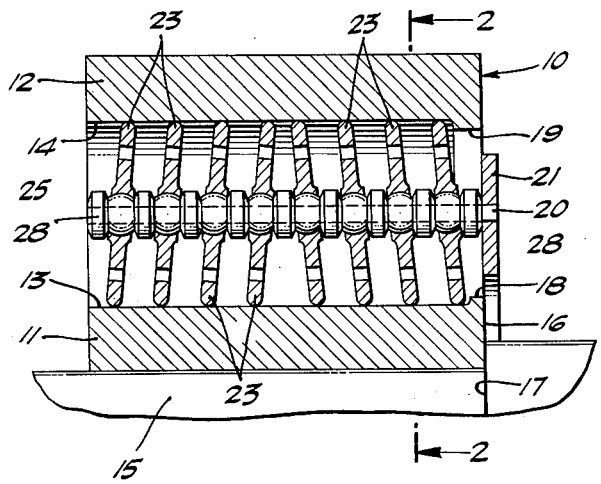
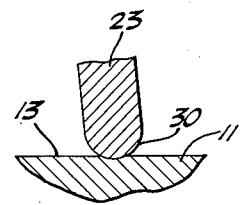
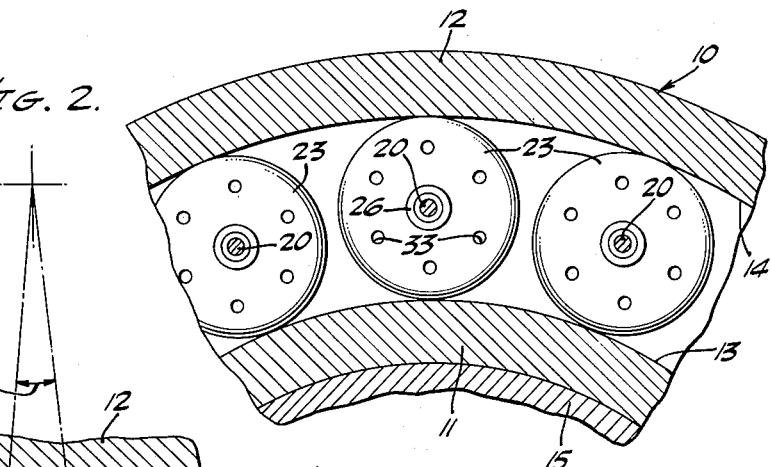
LEO I. KAPLAN
INVENTOR.
BY 
ATTORNEYS

United States Patent Office 3,031,238
Patented Apr. 24, 1962

3,031,238
ANTI-FRICTION BEARING ASSEMBLY
Leo I. Kaplan, Sunland, Calif., assignor to Poly Industries, Inc., Pacoima, Calif., a corporation of California
Filed Mar. 28, 1960, Ser. No. 17,812
19 Claims. (Cl. 308—215)

This invention relates to anti-friction bearings and more particularly to an improved bearing assembly wherein the anti-friction elements comprise thin wafer-like disc elements arranged in groups each having a supporting shaft and particularly characterized in that the individual discs rotate in a plane inclined at a slight angle to a right plane through the surface of the bearing raceway at the point of contact of the disc element therewith.

The present application is a continuation-in-part of my co-pending application for United States Letters Patent Serial No. 536,450, filed September 26, 1955, entitled Disc Type Roller Bearing.

As is explained in this earlier filed application for Letters Patent, certain advantages and benefits are realizable in an anti-friction bearing assembly utilizing a multiplicity of thin discs of large heat dissipating surface areas in lieu of either the commonly employed ball or roller type bearing elements. Molecular friction caused by the deformation of the contacting portion of the bearing components under load is an important factor affecting the efficiency and service life of an anti-friction bearing. The continuing deformation of the load carrying parts results in the generation of objectionable and undesirable quantities of heat detrimental to the physical structure of the materials unless adequate provision is provided for dissipating this heat quickly and before it can accumulate in sufficient amount to cause harmful temperature rises. These objectives are served by providing a large number of discs which are axially thin and provided with large heat dissipating areas. Spacing of the discs to permit free circulation of a cooling medium is also important.

It has been found that a bearing assembly having new and improved operating characteristics and capable of carrying both axial and radial loads can be provided by thin disc anti-friction elements designed and disposed as herein taught, and this is true even though the raceway surfaces in contact with the anti-friction discs are concentric to one another with all surfaces being parallel to the axis of rotation of a supporting shaft or the like. The described objectives are accomplished by canting the plane of the individual discs at a slight angle relative to a right plane through the point of contact of the disc with the raceway surfaces. If this angle of inclination is kept small, and preferably within ten degrees from the right plane, it is found that little or no lateral support is required to maintain the discs rotating uniformly at this inclination, any necessary lateral support being readily provided by appropriately designed spacer elements between the adjacent hub areas of adjacent discs. By inclining part of the discs on a given shaft oppositely to the direction of inclination of the remainder of the discs, the resulting assembly is effective in carrying opposed thrust loads applied to the bearing assembly from either axial end thereof. It will also be understood that the anti-friction disc elements of this invention can be arranged between concentric ring raceways or between axially spaced raceways having their bearing faces opposed to one another and in contact with the disc elements at diametrically spaced points.

Accordingly, it is a primary object of the invention to provide an improved anti-friction bearing assembly featuring the use of a multiplicity of independent disc elements the plane of rotation of which is inclined slightly to a right plane through the contacting surface of cooperating raceway members therefor.

Another object of the invention is the provision of an anti-friction bearing assembly having a plurality of groups of anti-friction discs, each group being mounted on independent supporting shafts arranged in a circle between a pair of cooperating raceway members and characterized in that said discs are inclined slightly relative to a plane normal to the axis of the supporting shaft for said discs.

Another object of the invention is the provision of a plurality of similar anti-friction disc elements mounted on a common supporting shaft and each having limited tilting movement relative to the axis of the shaft.

Another object of the invention is the provision of a group of similar anti-friction discs of thin material mounted on a common supporting shaft and held spaced from one another by means permitting each disc to rotate in a plane inclined slightly to the axis of the shaft.

Another object of the invention is the provision of a preloaded anti-friction bearing assembly in which the anti-friction elements comprise a multiplicity of similar thin discs all of which remain continuously under preload between a pair of cooperating raceways and arranged to rotate in a plane inclined slightly to a right plane through the contacting surfaces of the raceways and cooperative therewith to continue to rotate in said slightly inclined plane without need for the application of substantial lateral supporting force.

Another object of the invention is the provision of a combination radial and thrust anti-friction bearing assembly in which a cooperating pair of race ring members are held spaced apart by a multiplicity of similar spaced discs inclined at its wide angle to the contacting surfaces of the raceways and effective in resisting thrust loads by reason of slight inclination of the individual discs relative to the raceway members.

These and other more specific objects will appear upon reading the following specification and claims and upon considering in connection therewith the attached drawing to which they relate.

Referring now to the drawing in which a preferred embodiment of the invention is illustrated:

FIGURE 1 is a fragmentary cross-sectional view through a concentric ring type anti-friction bearing incorporating the present invention;

FIGURE 2 is a fragmentary view taken along line 2—2 on FIGURE 1;

FIGURE 3 is a fragmentary view on enlarged scale similar to FIGURE 1 but showing details of the bearing for the individual discs and of the spacer elements between adjacent disc bearing elements; and FIGURE 4 is a fragmentary sectional view on enlarged scale showing the rim of an individual disc element slightly deforming the raceway surface in contact therewith.

Referring to FIGURES 1 to 4 there is shown an illustrative embodiment of the invention comprising an anti-friction bearing assembly designated generally 10. This assembly includes an inner raceway ring 11 and an outer raceway ring 12 having opposed cylindrical raceway surfaces 13 and 14 respectively. Inner ring 11 is press mounted or otherwise fixedly secured to a shaft 15 with one radial end 16 abutting a shoulder 17 of the shaft. As herein shown, ring 11 has a low-height outwardly projecting annular flange 18 at one end thereof whereas outer ring 12 has a similar but inwardly projecting flange 19.

Surfaces 13 and 14 of the raceway rings are held spaced apart concentrically of the axis of shaft 15 by a plurality of groups of thin disc type anti-friction elements, each group of discs being mounted on a separate supporting shaft 20 parallel to one another and to the axis of the shaft and arranged in a ring between raceways 11 and 12. At least one end of each of shafts 20 is rigidly supported by a common cage ring 21. The similar discs 23 are provided with spherically shaped bearing surfaces 24 at their axis having an accurate rotating fit with the complementally shaped surfaces of bearing elements 25 which are freely rotatable on shaft 20. As is best shown in FIGURE 3 the axial length of each bearing 25 is greater than the axial length of hub 26 of discs 23 by a predetermined value for a purpose described below. This difference in axial length is sufficient to permit the disc to rotate in a plane inclined at a small angle relative to the axis of shaft 20 and relative to a right plane through the axes of these shafts and through bearing surfaces 13, 14. Bearings 25 are identical with one another and are held spaced apart lengthwise of shaft 20 by spacers 28 having parallel end faces in direct contact with the parallel opposite ends of bearing members 25. Preferably the portions of spacers 28 adjacent their cylindrical rims are beveled so as to converge toward one another as is indicated at 29 at respective angles at least equal and preferably slightly in excess of the angle of inclination or cant of discs 23 to the axes of shafts 20.

It will be understood that, desirably, the peripheral rims of anti-bearing elements or discs 23 are rounded as is indicated at 30 and accurately finished with all discs having identical diameters and identically transversely contoured rims to a high tolerance value. Equally important is the fact that the diameters of discs 23 are a few thousandths greater than the distance between the points of contact on surfaces 13 and 14 of rings 11 and 12, this distance being measured along a median plane through each disc while canted at the desired operating angle relative to a plane normal to shaft 20 and to bearing surfaces 13 and 14. This slight excess diameter of the discs over the actual spacing between the raceway surfaces taken at the angle just mentioned insures that the point of contact of each disc with each bearing surface is under predetermined preload such that the contacting surfaces of the disc and of the space rings are slightly and momentarily distorted as one raceway rotates relative to the other and relative to the disc therebetween. The distortion of the contacting surfaces is within the yield point of the component material of the elements with the result that only elastic distortion well within the yield strength of the materials takes place and then only at the points of actual load contact. In other words, it will be understood that the rounded rims of the discs canted at a slight angle to a normal plane through the point of contact prevents the disc from deviating from the desired angle of inclination as it rolls along in contact with surfaces 13 and 14.

Aiding in holding the discs in desired parallel planes of rotation are the accurately beveled surfaces 29 on the end walls of spacer rings 28.

A further important aspect of the pre-loading of the discs and the continuous distortion of the areas in direct contact resides in the fact that no disc of the entire assembly is ever free of load or of minimum distortion. Hence, the discs never have an opportunity to slow down. It follows that all discs must rotate in unison and at precisely the same speed.

Desirably, a portion of the discs mounted on a common shaft 20 are inclined oppositely to the inclination of the remaining discs on that shaft, as for example in the manner illustrated in FIGURES 1 and 3 wherein one-half the discs are shown inclined to the right and the remainder to the left of a right plane through shaft 15 and surfaces 13, 14. This arrangement has a decided advantage and the capability of absorbing very appreciable thrust loads in either direction axially of shaft 15. The angle of cant is relatively small and preferably within the range of two to ten degrees with respect to the described right plane. Accordingly, the angle between median planes of a pair of adjacent oppositely inclined discs is between four and twenty degrees, or double the angular range between the median plane and a right plane to the axis of the supporting shaft for the disc. It is found that when the angle is held within the specified limits the assembly operates at maximum efficiency and has pronounced thrust capacity in both axial directions and that the discs operate within the prescribed inclined plane without imposing objectionable loads between surfaces 29 of spacers 28 and the end faces of disc hubs 26.

Another feature of the design is the use of relatively thin disc elements 23 having large surface areas available for dissipating heat created by the load forces and the molecular friction arising principally by the continuous distortion occurring between the bearing rings and the contacting rims of the discs. Furthermore, the spacers between adjacent discs provide free access for the circulation of a cooling medium, as for example, the forced and rapid circulation of lubricant vapor. Efficient cooling may be facilitated by the provision of perforations 33 through the discs. However, it is found in practice that these perforations are not essential and there is ample clearance space provided in the assembly for the circulation of the cooling fluid axially between the raceway rings as well as through and between the discs of a given group.

It is further pointed out that the individual discs may be made of high strength resilient material capable of distorting under load without taking a permanent set. In order to take even greater advantage of the resiliency of the discs each of the discs may be slightly dished as in the manner disclosed in my earlier filed co-pending application identified above. Desirably, the pre-load forces acting on the individual discs is closely related to the contemplated load stress to be imposed on a given disc. As will be apparent from this fact the imposition or removal of the load on the bearing assembly has substantially no effect on the deformation of any component of the assembly since the parts are already operating under a distortion equivalent or in excess of that imposed by the design load. Accordingly, the assembly operates at maximum efficiency irrespective of whether an external load is present. It follows that changing load conditions do not have any noticeable or measureable effect on the operation of the discs or of the assembly taken as a whole; nor do changing load conditions tend to modify the plane in which the discs operate.

While the particular anti-friction bearing assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An anti-friction bearing comprising a pair of spaced apart raceway rings, means supporting a plurality of shafts distributed circumferentially of one another in the annular gap between said rings, and a plurality of similar anti-friction discs mounted on each of said shafts with the plane of rotation of said discs inclined slightly with respect to a plane normal to the axis of the supporting shaft thereof.

2. An anti-friction bearing as defined in claim 1 characterized in the provision of means holding said discs axially spaced apart on each of said shafts.

3. An anti-friction bearing as defined in claim 1 characterized in that certain of the discs on each of said shafts are inclined oppositely to the inclination of other discs on said shafts.

4. An anti-friction bearing as defined in claim 1 characterized in that there are a plurality of said discs on each shaft parallel to one another.

5. An anti-friction bearing as defined in claim 1 characterized in that the rims of said discs are rounded.

6. An anti-friction bearing as defined in claim 1 characterized in that said discs are thin and provided with a plurality of transverse openings extending between the opposite faces thereof.

7. An anti-friction bearing as defined in claim 1 characterized in the provision of a bearing between each of said discs and said shaft which bearing has a spherically surfaced exterior mating with a complemental surface of the disc in contact therewith.

8. An anti-friction bearing as defined in claim 1 characterized in the provision of spacer means journaled on said shafts between adjacent ones of said discs.

9. An anti-friction bearing as defined in claim 3 characterized in that the inclination of said discs to a plane normal to the surface of said raceway rings is less than ten degrees.

10. An anti-friction bearing as defined in claim 1 characterized in that the inclination of said discs are inclined to a plane normal to the surface of said raceways at an angle between two and ten degrees.

11. An anti-friction bearing as defined in claim 8 characterized in that said spacers have opposed end faces converging outwardly toward the rim edges thereof.

12. A combination thrust and radial anti-friction bearing comprising a pair of annular raceway members having opposed faces uniformly spaced from one another, a plurality of shafts substantially uniformly spaced from one another circumferentially of and between said raceway members, and a plurality of discs mounted on each of said shafts with part thereof inclined in one direction and part in the opposite direction relative to a plane normal to the surface of said raceways whereby said discs are adapted to support both thrust and radial loads.

13. An anti-friction bearing as defined in claim 12 characterized in that the angle of inclination of discs oppositely inclined to one another on a given shaft lie within an angle of 4 to 20 degrees.

14. An anti-friction bearing as defined in claim 12 characterized in that each of said discs includes a universal bearing positioned between the disc and the shaft on which the same is mounted.

15. An anti-friction bearing as defined in claim 12 characterized in that the rim of said discs are rounded and of substantially uniform diameter, said diameter being slightly in excess of the distance between the opposed faces of said raceway members in contact with the rims of said discs.

16. An anti-friction bearing adapted to withstand both thrust and reversing thrust loads, said bearing comprising a pair of concentric raceway rings, an anti-friction unit adapted to be mounted between the opposed concentric annular surfaces of said rings, said unit including a plurality of parallel shafts arranged in a ring having a median diameter corresponding to that of a median circle between said opposed annular surfaces, cage means interconnecting the opposite ends of said shafts, and a plurality of axially spaced identical anti-friction discs mounted on said shafts with part thereof inclined oppositely to the remainder relative to the axis of the shaft on which mounted.

17. An anti-friction bearing as defined in claim 16 characterized in that the diameters of said identical discs are slightly in excess of the radial spacing between the opposed annular surfaces of said raceway rings whereby said discs are under preload stress in the assembled position of the defined bearing components.

18. An anti-friction bearing as defined in claim 17 characterized in that each of said discs is inclined not in excess of ten degrees with respect to a plane normal to the axes of said raceway rings.

19. An anti-friction bearing as defined in claim 16 characterized in the provision of spacers on each of said shafts between adjacent ones of said discs, each of said spacers having outwardly converging end faces disposed closely beside the hub portion of the adjacent ones of said discs.

References Cited in the file of this patent

UNITED STATES PATENTS

| | | |
|---|---|---|
| 877,630 | Bussman | Jan. 28, 1908 |
| 983,792 | Whitney | Feb. 7, 1911 |
| 2,499,640 | Gamet | Mar. 7, 1950 |

FOREIGN PATENTS

| | | |
|---|---|---|
| 4,250 | Great Britain | Feb. 19, 1902 |